(12) United States Patent
Tsuchikawa et al.

(10) Patent No.: US 9,126,583 B2
(45) Date of Patent: Sep. 8, 2015

(54) CONTROL DEVICE FOR HYBRID VEHICLE

(75) Inventors: Haruhisa Tsuchikawa, Yokohama (JP); Yuya Kogure, Zama (JP); Hiroki Shimoyama, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/236,357

(22) PCT Filed: Jul. 10, 2012

(86) PCT No.: PCT/JP2012/067529
§ 371 (c)(1),
(2), (4) Date: Jan. 31, 2014

(87) PCT Pub. No.: WO2013/021765
PCT Pub. Date: Feb. 14, 2013

(65) Prior Publication Data
US 2014/0180521 A1    Jun. 26, 2014

(30) Foreign Application Priority Data

Aug. 9, 2011    (JP) .................................. 2011-173770

(51) Int. Cl.
*B60W 20/00* (2006.01)
*B60L 11/00* (2006.01)
(Continued)

(52) U.S. Cl.
CPC .................. *B60W 20/10* (2013.01); *B60K 6/48* (2013.01); *B60L 7/14* (2013.01); *B60L 7/24* (2013.01);
(Continued)

(58) Field of Classification Search
CPC ...... B60W 20/00; B60W 20/10; B60W 20/40
USPC ......... 701/22, 67–69; 180/65.1, 65.21, 65.22, 180/65.225, 65.23, 65.26, 65.245, 65.265, 180/65.28, 65.285; 903/912, 914, 930, 946
See application file for complete search history.

(56) References Cited

U.S. PATENT DOCUMENTS 8,060,268 B2 * 11/2011 Hasegawa et al. ............... 701/22
8,187,146 B2 * 5/2012 Allgaier et al. .................... 477/5
(Continued)

FOREIGN PATENT DOCUMENTS

| JP | 2000-324614 A | 11/2000 |
|---|---|---|
| JP | 2007-314097 A | 12/2007 |

(Continued)

OTHER PUBLICATIONS

International Search Report for corresponding International Application No. PCT/JP2012/067529, mailed Sep. 11, 2012 (4 pages).

*Primary Examiner* — Thomas Tarcza
*Assistant Examiner* — Tyler J Lee
(74) *Attorney, Agent, or Firm* — Osha Liang LLP

(57) ABSTRACT

A control device for a hybrid vehicle has an engine, a motor configured to output a driving force of the vehicle and performing a startup of the engine, a first engagement element interposed between the engine and the motor that selectively connects and releases the engine and the motor, a second engagement element interposed between the motor and a driving wheel that selectively engages and releases the motor and the driving wheel, a driving force transmission system load detecting device that either detects or estimates a load of the driving force transmission system, and an engine/motor slip drive control unit that slip engages the first engagement element with the engine maintaining in rotating state at a predetermined rotation speed, and slip engages the second engagement element with the motor at a rotation speed lower than the predetermined rotation speed.

10 Claims, 10 Drawing Sheets

(51) Int. Cl.
  *B60K 6/48* (2007.10)
  *B60L 11/14* (2006.01)
  *B60W 10/02* (2006.01)
  *B60W 10/06* (2006.01)
  *B60W 10/08* (2006.01)
  *F02D 29/02* (2006.01)
  *B60L 15/20* (2006.01)
  *B60L 7/24* (2006.01)
  *B60L 7/14* (2006.01)
  *B60L 11/18* (2006.01)
  *B60W 30/184* (2012.01)

(52) U.S. Cl.
  CPC ............ *B60L 11/14* (2013.01); *B60L 11/1861* (2013.01); *B60L 15/2009* (2013.01); *B60L 15/2054* (2013.01); *B60W 10/02* (2013.01); *B60W 10/06* (2013.01); *B60W 10/08* (2013.01); *B60W 20/00* (2013.01); *F02D 29/02* (2013.01); *B60K 2006/4825* (2013.01); *B60L 2210/40* (2013.01); *B60L 2220/14* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2240/507* (2013.01); *B60L 2240/642* (2013.01); *B60L 2260/26* (2013.01); *B60L 2260/44* (2013.01); *B60W 20/108* (2013.01); *B60W 30/184* (2013.01); *B60W 2510/0241* (2013.01); *B60W 2510/1025* (2013.01); *B60W 2710/025* (2013.01); *B60W 2710/0644* (2013.01); *B60W 2710/081* (2013.01); *B60Y 2300/429* (2013.01); *Y02T 10/6221* (2013.01); *Y02T 10/6252* (2013.01); *Y02T 10/6286* (2013.01); *Y02T 10/642* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/93* (2013.01)

(56) References Cited

U.S. PATENT DOCUMENTS

| | | | |
|---|---|---|---|
| 8,423,230 B2 * | 4/2013 | Steinhauser et al. | 701/29.2 |
| 2003/0144773 A1 * | 7/2003 | Sumitomo | 701/22 |
| 2007/0275819 A1 * | 11/2007 | Hirata | 477/5 |
| 2009/0143950 A1 | 6/2009 | Hasegawa et al. | |
| 2010/0248893 A1 * | 9/2010 | Shimanaka | 477/5 |
| 2012/0271498 A1 * | 10/2012 | Kobayashi | 701/22 |

FOREIGN PATENT DOCUMENTS

| | | |
|---|---|---|
| JP | 2008-245517 A | 10/2008 |
| JP | 2009-132195 A | 6/2009 |
| JP | 2010-30486 A | 2/2010 |
| JP | 2010-155590 A | 7/2010 |
| JP | 2010-201962 A | 9/2010 |
| JP | 2010-202114 A | 9/2010 |

* cited by examiner

FIG. 7

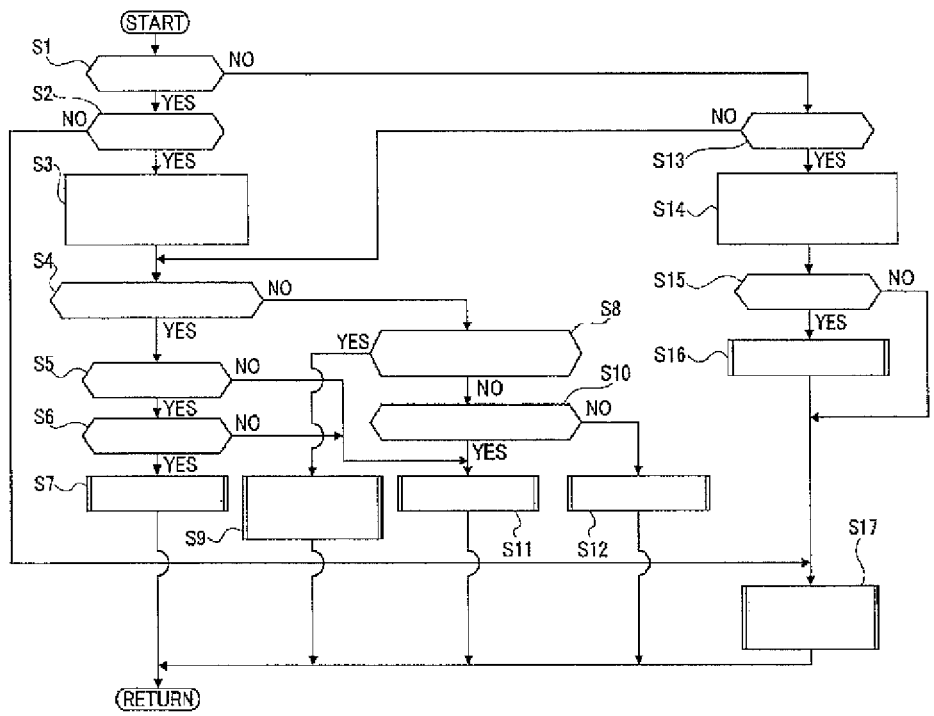

S1: Normal mode map
S1: Normal mode map?
S2: Estimated gradient > g2?
S3: Normal mode map→
  MWSC corresponding mode map
S4: MWSC drive mode region ?
S5: SOC> predetermined value A?
S6: TCL2 < predetermined valueB?
S7: MWSC control processi
S8: MWSC+CL1 slip control drive mode region?
s9: MWSC+CL1 slip control process S10: WSC drive mode region?
S11: WSC control process
S12: HEV control process
S13: Estimated gradient > g1?
S14: MWSC corresponding mode map →
  Normal mode map
S15: Drive mode switch
S16: Drive mode switch process
S17: Control process according to Normal mode map

CONTROL DEVICE FOR HYBRID VEHICLE

CROSS-REFERENCE TO RELATED APPLICATIONS

This application claims priority based on Japanese Patent Application No. 2011-173770 filed in Japan Patent Office on Aug. 9, 2011, the disclosures of all of which are incorporated herein by reference in its entirety.

BACKGROUND

1. Technical Field

The present invention relates to a control device for a hybrid vehicle which has an engine and an electric motor as a driving source with a first engagement element interposed between the engine and the motor engine while second engagement element interposed between the motor and a driving wheel.

2. Related Art

In such a hybrid vehicle having a first engagement element between the engine and the motor and having a second engagement element between the motor and the driving wheel, the second engagement element is protected by suppressing excessive heat generation when the load in a driving force transmission system is large. A system is known (see Patent Document 1, for example), in which, when the load in the driving force transmission system is equal to a predetermined value or more, the first engagement element CL1 is released with the engine operating while the second engagement element CL2 is slip-engaged so that the motor is held at a rotation speed lower than the engine rotation speed.

Patent Document 1: JP Patent Application Publication No. 2009-132195 A

SUMMARY

However, in the control device of the hybrid vehicle described above, although the slip rotation speed of the second engagement element CL2 is reduced using the motor, the strategy will not be applicable when a battery output or a motor output is restricted.

One or more embodiments of the present invention provides a control device for a hybrid vehicle that can achieve a reduction in motor torque in a motor slip drive control mode to be executed when the load in the driving force transmission system is large.

A control device for a hybrid vehicle according to one or more embodiments of the present invention comprises an engine, a motor, a first engagement element, a load detecting device of the driving force transmission system, and an engine/motor slip drive control unit. The motor is configured to output a driving force of the vehicle in addition to starting the engine. The first engagement element is interposed between the engine and the motor for selectively engaging and releasing the engine and the motor. The second engagement element is interposed between the motor and the driving wheel for selectively engaging and releasing the motor and the driving wheel. The load detecting device of the driving force transmission system either detects or estimates the load of the driving force transmission system.

The engine/motor slip drive control unit is operable, when the load of the driving force transmission system is equal to or greater than a predetermined value, to slip-engage the first engagement element with the engine operating at a predetermined rotation speed while slip-engage the second engagement element with the motor rotating at a rotation speed lower than the predetermined rotation speed.

Thus, when the load of the driving force transmission system is equal to a predetermined value or more, the engine/motor slip drive control unit is operative to slip-engage the first engagement element with the engine operating at a predetermined rotation speed while slip-engaging the second engagement element at a rotation speed lower than the predetermined rotation speed.

That is, since the motor rotates at a rotation speed lower than the engine speed, it is possible to reduce the slip amount of the second engagement element so that it is possible to suppress the heating amount of the second engagement element. Further, since the engine is in operating state and the first engagement element is slip-engaged, a driving torque from the engine is transferred via the first engagement clutch so the required motor torque may be reduced by the engine torque amount transmitted.

As a result, it is possible to reduce the motor torque during a motor slip drive control mode to be executed when the load of the driving force transmission system is high.

BRIEF DESCRIPTION OF THE DRAWINGS

FIG. 7 is a flowchart showing the flow of driving mode transition control process executed by the integrated controller in the first embodiment;

DETAILED DESCRIPTION

Hereinafter, embodiments of the present invention are described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

First, description will be given of the configuration.

The configuration of the control device in a hybrid vehicle in the first embodiment is described by dividing into a "system configuration", a "control configuration of the integrated controller", and a "driving mode transition control configuration", respectively.

[System Configuration]

Figure 1:
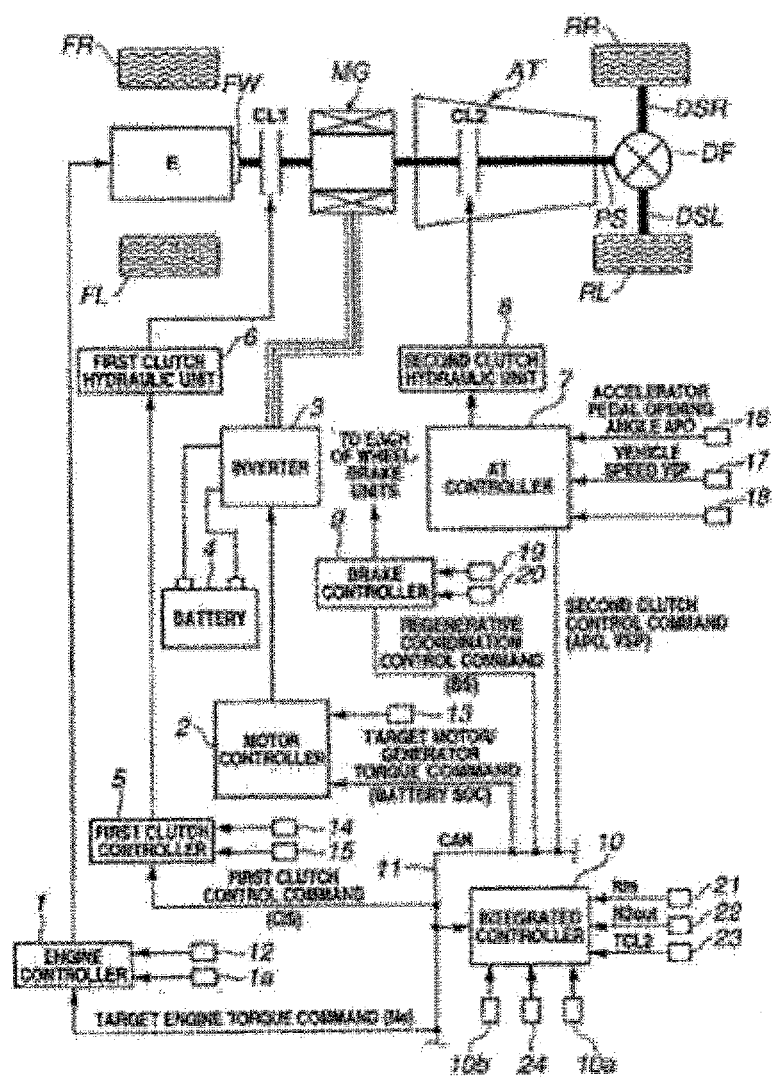
FIG. 1 is an overall system configuration of a rear-wheel drive hybrid vehicle to which a control device of a first embodiment is applied.

FIG. 1 is an overall system diagram showing a rear-wheel drive hybrid vehicle control device to which the first embodiment is applied. Below, with reference to FIG. 1, the system configuration (configurations of driving system and control system) is described.

As shown in FIG. 1, the driving system in a hybrid vehicle includes an engine E, a first clutch CL1 (a first engagement element), a motor generator MG (motor), a second clutch CL2 (second engagement element), an automatic transmission AT, a propeller shaft PS, a differential DF, a left drive shaft DSL, a right drive shaft DSR, a left rear wheel RL (drive wheel), and a right rear wheel RR (drive wheel). Note that FL denotes a left front wheel and FR denotes a right front wheel.

The engine E is, for example, a gasoline engine, and includes a throttle valve whose valve opening angle is controlled on the basis of a control command from an engine controller 1. Here, a flywheel FW is provided on an output shaft of engine E.

The first clutch is a clutch interposed between the engine E and the motor generator MG, which, on the basis of a control command from the first clutch controller 5 described later, is subject to control to selectively engage and release, including slip engagement by a hydraulic pressure produced by the first clutch hydraulic unit 6.

The motor generator MG is a synchronous motor generator stator in which permanent magnets are embedded into a rotor and stator coils are wound around a stator. The motor generator MG is controlled by a three-phase alternating current generated by an inverter 3 and applied based on a control command from a motor controller 2 described below. This motor generator MG can be operated as an electric motor that rotates by receiving a supply of electrical power from a battery 4 (hereinafter, this state is referred to as a "driving" state). In a case where the rotor is rotated by an external force, the motor generator MG can also be operated as a generator that generates an electromotive force at both ends of the stator coil to enable charging of the battery 4 (hereinafter, this operating state is referred to as a "regenerative" state). Note that the rotor of this motor generator MG is connected to an input shaft of the automatic transmission AT through a damper (not shown).

The second clutch CL2 is a clutch which is interposed between the motor generator MG and the left and right rear wheels RL. Based on the control command from AT controller 7 to be described later, the second clutch CL2 is subject to control to be selectively engaged and released with a slip engagement included by a hydraulic pressure generated by the second clutch hydraulic unit 8.

The automatic transmission AT is a stepped automatic transmission in which a gear ratio of limited stages, such as seven forward speeds and one reverse speed, can automatically be shifted according to vehicle operating conditions, such as a vehicle speed and an accelerator opening angle. The second clutch CL2 is not necessarily a clutch that is newly added as a dedicated clutch. Instead, some clutch elements of a plurality of clutches which are selectively engaged at respective gear shift stage of the automatic transmission AT may comprise the second clutch CL2. Further, an output shaft of the automatic transmission AT is connected to the rear-left and rear-right wheels RL, RR through the propeller shaft PS, the differential gear DF, the left drive shaft DSL and the right drive shaft DSR, respectively.

This hybrid drive system has three drive modes according to a state of the engagement and release/disengagement of the first clutch CL1. A first drive mode is an electric vehicle drive mode (hereinafter referred to as an EV drive mode) in which the first clutch CL1 is in a released state and the vehicle travels by only the driving power of the motor generator MG as the power source. A second drive mode is a hybrid drive mode (hereinafter referred to as an HEV drive mode) in which the first clutch CL1 is in an engaged state and the vehicle travels while including the engine E as the power source. A third drive mode is an engine used slip drive mode (Wet Start Clutch drive mode, hereinafter referred to as a WSC drive mode) in which the first clutch CL1 is in the engaged state and the second clutch CL2 is subject to a slip control, and the vehicle travels while the engine E is included as the power source. While in the WSC drive mode, the vehicle is capable of achieving a creep drive, especially when a state of charge (SOC) of a battery is low or when an engine water temperature is low. Note that, when transitioning from the EV drive mode to the HEV drive mode, the first clutch CL1 is engaged and engine will be started using torque of the motor generator MG.

Further, in the uphill road or the like with a gradient of a predetermined value or more, when a driver controls an accelerator pedal to maintain a vehicle stopped state to perform an accelerator hill hold, the slip amount of the second clutch CL2 may be continued with being too large when transitioned to the WSC drive mode. This is because the rotation speed of the engine E cannot be set to be lower than an engine idling speed. Accordingly, in order to perform protection of CL2, the vehicle is further provided with a motor slip drive mode with CL1 being released (Motor Wet Start Clutch drive mode, hereinafter referred to as an MWSC drive mode) as well as a motor slip drive mode with CL1 being slip-engaged (hereinafter, referred to as MWSC;CL1 slip control drive mode). In the "MWSC drive mode", with both the engine E and the motor generator MG being operative, the first clutch CL1 is released while the second clutch CL2 is slip-engaged for travelling. In the "MWSC+CL1 slip control drive mode", with both the engine E and the motor generator MG being operating, both the first clutch CL1 and the second clutch CL2 are subject to slip control for propulsion of the vehicle. Note that the description will be detailed below.

The above-described HEV drive mode includes three drive modes: an engine drive mode, a motor-assisted drive mode and a running electric power generation or drive generation mode.

In the engine drive mode, the drive wheels are driven with only the engine E as the power source. In the motor-assisted drive mode, the drive wheels are driven with both of the engine E and the motor-generator MG as power sources. In the drive generation mode, while the drive wheels RL, RR are being driven with the engine E as the power source, the motor generator MG works as a generator. Further, during deceleration operations, the above-described HEV drive mode includes three drive modes: an engine drive mode, a motor-assisted drive mode and a running electric power generation mode (hereinafter called a drive generation mode).

In the engine drive mode, the drive wheels are driven with only the engine E as the power source. In the motor-assisted drive mode, the drive wheels are driven with both of the engine E and the motor-generator MG as power sources. In the drive generation mode, while the drive wheels RL, RR are being driven with the engine E as the power source, the motor-generator MG works as a generator to charge the battery 4. Further, during a deceleration operation, the power generation by the motor generator MG by regenerative braking energy is used for charging the battery 4. As a further mode, at the vehicle being stopped, a generating mode is provided to allow the motor generator MG to operate using power of the engine E.

As shown in FIG. 1, the control system of the hybrid vehicle is provided with an engine controller 1, a motor controller 2, an inverter 3, a battery 4, a first clutch controller 5, a first clutch hydraulic unit 6, an AT controller 7, a second clutch hydraulic unit 8, a brake controller 9 and an integrated controller 10. The engine controller 1, the motor controller 2, the first clutch controller 5, the AT controller 7, the brake controller 9 and the integrated controller 10 are communicated via a CAN communication line 11 for enabling to exchange information with each other.

The engine controller 1 receives information of the engine rotation speed from an engine rpm sensor 12 and outputs a command that controls an engine operating point (Ne: the engine rotation speed, Te: an engine torque) to a throttle valve actuator (not shown in the drawing), for example, in accordance with a target engine torque command from the integrated controller 10. The content of the engine control is detailed below. The information such as the engine revolution speed Ne, etc., is sent to the integrated controller 10 via the CAN communication line 11.

The motor controller 2 receives information from a resolver 13 that detects a rotational position of the rotor of the motor generator MG and outputs a command that controls a motor operating point (Nm: a motor-generator rotation speed, Tm: a motor-generator torque) of the motor-generator MG to the inverter 3 in accordance with a target motor-generator torque command from the integrated controller 10. Note that the motor controller 2 checks or watches the battery SOC indicating the charged state of the battery 4. The information concerning the battery SOC is used to control the motor-generator MG and is also sent to the integrated controller 10 via the CAN communication line 11.

The first clutch controller 5 receives sensor information from both the first clutch hydraulic pressure sensor 14 and the first clutch stroke sensor 15 and outputs a command to the first clutch hydraulic unit 6 in accordance with a first clutch control command from the integrated controller 10 to selectively control the engagement and release of the first clutch CL1. Note that information regarding a first clutch stroke C1S is sent to the integrated controller 10 via the CAN communication line 11.

The AT controller 7 receives input corresponding to sensor information from an accelerator opening angle sensor 16, a vehicle speed sensor 17, a second clutch hydraulic pressure sensor 18 and an inhibitor switch that outputs a signal corresponding to a position of a shift lever that is operated by the driver. The AT controller 7 then outputs a command that selectively controls the engagement and release of the second clutch CL2 to the second clutch hydraulic unit 8 in an AT hydraulic pressure control valve in accordance with a second clutch control command from the integrated controller 10. Note that information of an accelerator opening angle APO and a vehicle speed VSP and the information from the inhibitor switch are sent to the integrated controller 10 via the CAN communication line 11.

The brake controller 9 receives sensor information from a road wheel speed sensor 19 that detects each wheel speed of the four road wheels and a brake stroke sensor 20. The brake controller 9 performs a regenerative coordination brake control on the basis of a regenerative coordination control command BS from the integrated controller 10 when, for example, a braking force is insufficient to meet a braking force required according to a brake stroke sensor 20 in the case where only a regenerative braking force is supplied upon a brake operation by the brake pedal depression. In this way, the shortage of the braking force is compensated for by a mechanical braking force (a braking force by a friction brake).

The integrated controller 10 manages consumption energy of the entire vehicle in order to allow the vehicle to travel at a maximum efficiency. The integrated controller 10 receives information from a motor rotation speed sensor 21 that detects the motor rotation speed Nm, a second clutch output rotation speed sensor 22 that detects an output revolution speed N2out of the second clutch CL2, a second clutch torque sensor 23 that detects a transmission torque capacity TCL2 of the second clutch CL2, a brake hydraulic pressure sensor 24, a temperature sensor 10a that detects a temperature of the second clutch CL2 and a G sensor 10b that detects a longitudinal acceleration. The integrated controller 10 also receives information obtained via the CAN communication line 11. Further, the integrated controller 10 performs operating control of the engine E by the control command to the engine controller 1, an operating control of the motor-generator MG by the control command to the motor controller 2, the selective engagement and release control of the first clutch CL1 by the control command to the first clutch controller 5 and the selective engagement and release control of the second clutch CL2 by the control command to the AT controller 7.

[Control Configuration of the Integrated Controller]

Next, with reference to the block diagram shown in FIG. 2, description will be given of a control configuration that is calculated by the integrated controller 10 in the first embodiment. For example, this operation is calculated by the integrated controller 10 in the control period of every 10msec.

Figure 2:
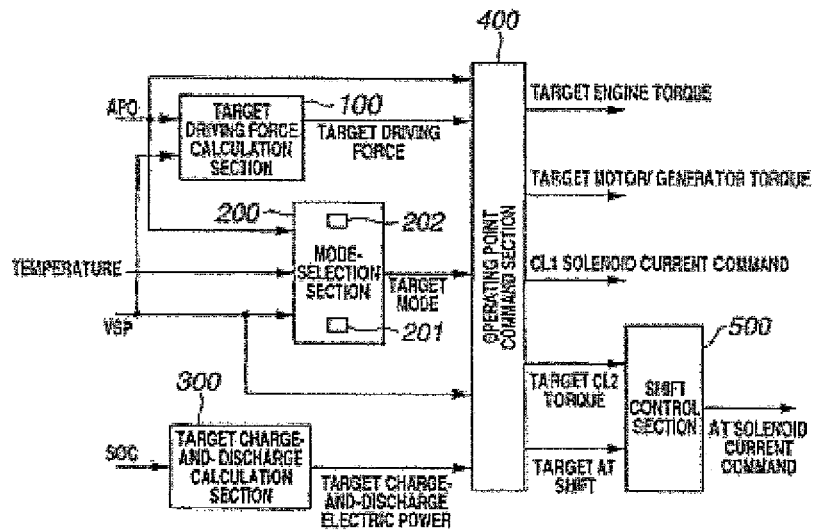
FIG. 2 is a control block diagram illustrating a calculation process program in an integrated controller in the first embodiment.

As shown in FIG. 2, the integrated controller 10 is provided with a target driving torque calculating unit 100, a mode selection unit 200, a target charge-discharge calculation unit 300, an operating point command unit 400, and a transmission control unit 500.

Figure 3:
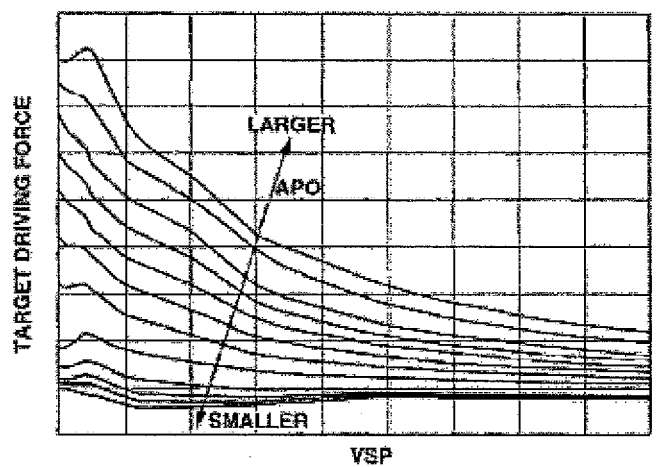
FIG. 3 is an example of a target driving torque map used in a target driving torque calculating section for calculating a target driving torque.

The target driving torque calculating unit 100 uses a target driving torque map shown in FIG. 3 to calculate a target driving torque tFoO based on a vehicle speed VSP and accelerator opening APO.

The mode selection unit 200 has a road gradient estimation calculation section 201 (driving force transmission system load detecting device) that estimates the road gradient based on the detected value of the G sensor 10b. The road surface gradient estimation calculation unit 201 calculates an actual acceleration from an acceleration average value based on the wheel speed sensor 19, and estimates the road surface gradient from the deviation of the G sensor detection value from the calculation result. A mode map selection unit 202 is further provided, based on the estimated gradient of road surface, to select one of two mode maps to be described below.

Figure 4:
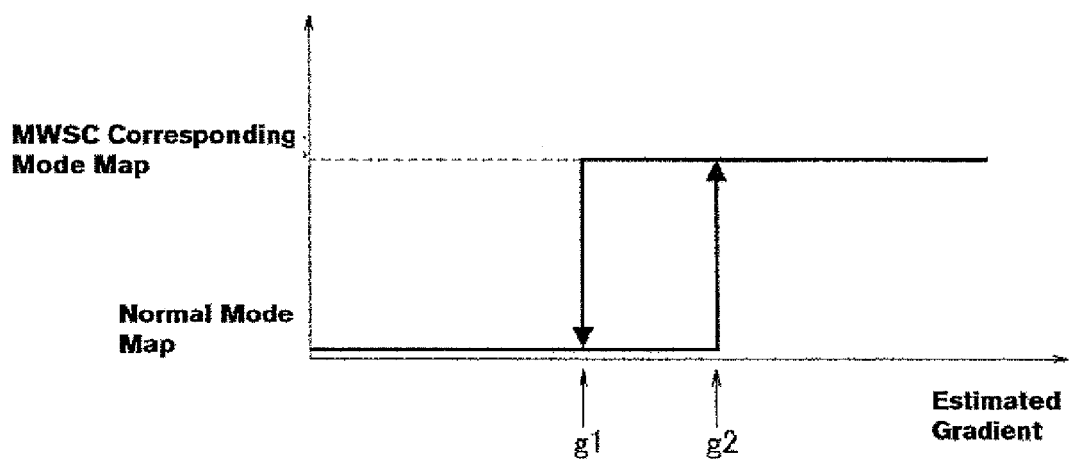
FIG. 4 is a diagram representing a relationship between an estimated gradient representative of mode selection criteria in a mode selection unit in FIG. 2 and a mode map.
Figure 5:
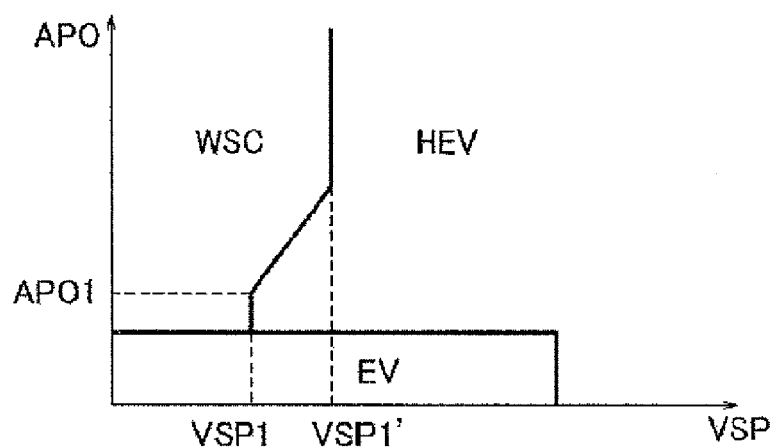
FIG. 5 is an example of a normal mode map in a selection of a target mode at the mode selection section shown in FIG. 2.

As shown in FIG. 4, the mode map selection unit or section 202 switches from state selecting the normal mode map (FIG. 5) to the MWSC corresponding mode map (FIG. 6) when the estimated gradient is equal to a predetermined value g2 or more. On the other hand, in a state selecting the MWSC corresponding mode map (FIG. 6) when the estimated gradient is less than the predetermined value g1 (<g2), control switches to the normal mode map (FIG. 5). In other words, by providing a hysteresis with respect to the estimated gradient, hunting of control will be prevented when switching map.

The normal mode map is selected when the estimated gradient is less than the predetermined value g1, and, as shown in FIG. 5, within the map, an EV drive mode, a WSC drive mode, and a HEV mode are provided. Depending on the accelerator opening AP0 and a vehicle speed VSP, a target mode is calculated. However, even if the EV drive mode is being selected, when the battery SOC is equal to or less than a predetermined value, the "HEV drive mode" is set as the target mode compulsorily. In the normal mode map shown in FIG. 5, the HEV→WSC switching line is set at a region lower than a lower limit vehicle speed VSP1 representing a rotation speed less than an idling speed of the engine E, in a region of less than the predetermined accelerator opening AP01 with the automatic transmission being at a first speed range.

Further, in the region of the accelerator opening equal to or greater than the predetermined accelerator opening AP01, since a large driving force is required, the WSC drive mode is set up until a vehicle speed VSP1' of higher than the lower limit vehicle speed VSP1. Incidentally, when the battery SOC is low and the EV drive mode cannot be achieved, the system is configured to select the WSC drive mode even at startup or the like. When the accelerator opening APO is large, it is sometimes difficult to achieve a required torque by an engine torque of the engine which rotates in the vicinity of idling rotation speed and a torque from the motor generator MG. Here, the engine torque can be increase to output more torque if the engine speed is increased. From this viewpoint, when outputting the larger torque by increasing the engine rotation speed, even if the WSC drive mode is executed at a vehicle speed higher than the lower limit vehicle speed VSP1, transition from the WSC drive mode to the HEV drive mode may be completed within a short time. This situation corresponds to the WSC region that is expanded up until the lower limit vehicle speed VSP1' shown in FIG. 5.

Figure 6A:
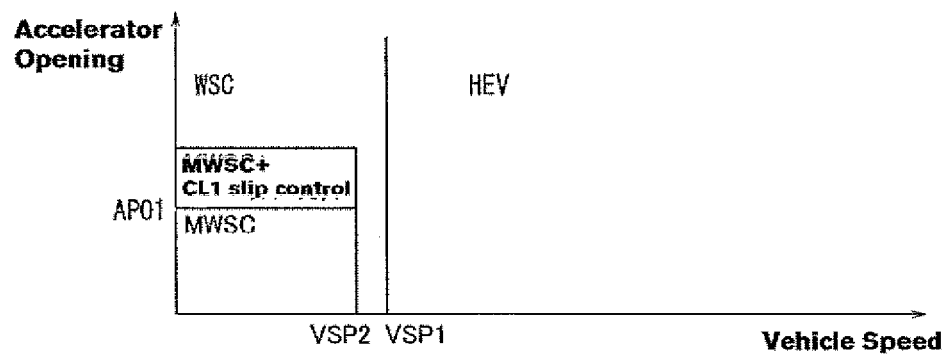
FIG. 6 is a diagram illustrating three patters of a MWSC corresponding mode map used in the selection of the target mode at the mode selection section in FIG. 2.
Figure 6B:
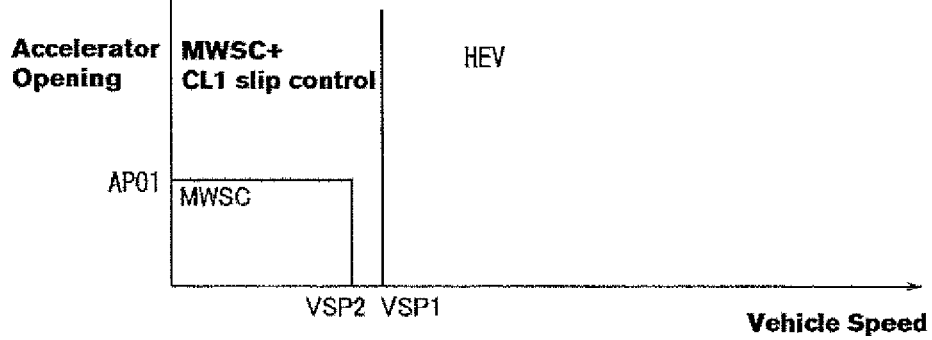
Figure 6C:
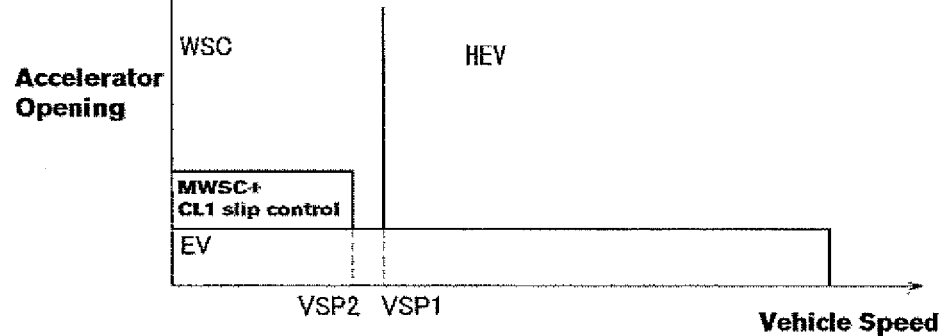

The MWSC corresponding mode map has a first schedule shown in FIG. 6A, a second schedule shown in FIG. 6B, and a third schedule shown in FIG. 6C. As shown in FIG. 6A, within the map, the first schedule has the WSC drive mode, the MWSC drive mode, the MWSC+CL1 slip control drive mode, and the HEV mode for a target mode to be calculated based on the accelerator opening AP0 and the vehicle speed VSP.

As shown in FIG. 6B, within the map, the second schedule has the MWSC drive mode, the MWSC+CL1 slip control drive mode, and the HEV drive mode for a target mode to be selected based on the accelerator opening AP0 and the vehicle speed VSP.

As shown in FIG. 6C, within the map, the third schedule has the WSC drive mode, the EV mode. The MWSC+CL1 slip control drive mode, and the HEV drive mode for a target mode to be selected based on the accelerator opening AP0 and the vehicle speed VSP.

These first to third schedules may be selected depending on the conditions of the first clutch CL1, the second clutch CL2 or the motor-generator MG for each vehicle model. Alternatively, at least two of the first to third schedules may be selectively used in a single hybrid vehicle.

The target charge-discharge calculation section 300 uses the target charge discharge amount map to calculate a target charge discharge power tP from the battery C.

The operating point command unit 400 calculates a transient target engine torque, a target motor generator torque, a target second clutch transmission torque capacity, a target speed ratio of the automatic transmission AT, and a current command of the first clutch solenoid as operating point reaching the target based on an accelerator opening AP0, a target driving torque tFoO a target mode, a vehicle speed VSP, and a target charge discharge power tP. The operating point command unit 400 is provided with an engine start control unit to allow the engine to start when the control transfers from the EV drive ode to the HEV drive mode.

The speed change control unit 500 and drives and controls the solenoid valve in the automatic transmission AT along a predetermined shift schedule so as to achieve the target second clutch transfer torque capacity and the target speed ratio change. Note that the shift map is the one in which the target gear position is set in advance based on the accelerator opening APO and vehicle speed VSP.

[Driving Mode Transition Control Arrangement]

FIG. 7 is a flowchart showing the flow of driving mode transition control processing executed by the integrated controller 10 in the first embodiment. Hereinafter, with reference to FIG. 7, each step will be described representing the drive mode transition control arrangement.

In step S1, it is determined whether or not a normal mode map is being selected. The process proceeds to step S2 when YES (selection of normal mode map) while the process proceeds to step S11 when NO (selection of MWSC corresponding mode map).

In step S2, following the YES determination at step S1, it is determined whether or not an estimated gradient is greater than a predetermined value g2, i.e., whether or not a load of the driving force transmission system is great. The process proceeds to step S3 if YES (the estimated gradient>g2), and the program proceeds to step S17 when NO (estimated gradient≤g2) and executes the control process based on the normal mode map.

In step S3, following the YES determination at step S2, switch to MWSC corresponding mode map from the normal mode map is made and the process proceeds to step S4.

In step S4, following the mode map switch in step S3 or the NO determination in step S13, the operating point determined by the current accelerator opening AP0 and vehicle speed VSP is present in the MWSC drive mode. The process proceeds to step S5 when YES (MWSC drive mode area) whereas the process proceeds to step S8 when NO (outside the MWSC traveling mode area).

In step S5, following the YES determination at step S4, it is determined whether the battery SOC is greater than a predetermined value A. The process proceeds to step S6 When YES (the battery SOC>A), and the process proceeds to step S11, when NO (battery SOC≤A).

Note that the predetermined value A represents a threshold for determining whether or not it is possible to secure the driving force only by motor generator MG. The driving force is ready to be secured only by the motor generator MG when the battery SOC is greater than the predetermined value A, whereas charging of the battery 4 is required when equal to the predetermined value A or less. Thus, selection of the MWSC drive mode will be prohibited.

In step S6, following the YES determination at step S5, it is determined whether or not the transmission torque capacity TCL2 of the second clutch CL2 is less than a predetermined value B. When YES (TCL2<B), the process proceeds to step S7, and when NO (TCL2≥B), the process proceeds to step S11. Note that the predetermined value B is representative of a predetermined value indicating that an excessive current does not flow to motor generator MG. Because the motor generator MG is subject to a rotation speed control, the generated torque by the motor generator MG exceeds a load of the driving force transmission system acting on the motor generator MG.

In other words, because the motor generator MG is subject to a rotation speed control so as to allow the second clutch to be in a slip state, the motor generator MG produces a torque greater than the second clutch transmission torque capacity TCL2. Thus, when the transmission torque capacity TCL2 of the second clutch CL2 is reached, the current though the motor generator MG will be excessive to thereby deteriorate the durability of the switching element and the like. To avoid this situation, when exceeding the predetermined value B, switching to the MWSC drive mode will be inhibited.

In step S7, following the YES determination at step S6, control performs the MWSC control process, and the process proceeds to RETURN.

Specifically, in the MWSC control process, the first clutch CL1 is released with the engine maintaining in the operating state and the engine E is controlled to attain an idling rotation speed. Further, the motor generator MG is feedback controlled to reach a target rotation speed (yet, at lower value than the idling speed) while the second clutch CL2 is feedback controlled to assume a transmission torque capacity corresponding to the target driving torque. Note that, because the MWSC drive mode is not provided in the normal mode map, the MWSC control process in step S7 includes a mode transition process from WSC drive mode and idling generation mode.

In step S8, following the NO determination at step S4, the operating point determined by the current accelerator opening AP0 and the vehicle speed VSP is within a region or area of the MWSC+CL1 slip control drive mode, When YES (within the MWSC+CL1 slip control drive mode area), the process speed to step S9, while, when NO (outside of the MWSC+CL1 slip control drive mode area), the control proceeds to S10.

In step S9, following the YES determination at step S8, control performs the MWSC+CL1 slip control process, and the process proceeds to RETURN. In the MWSC+CL1 slip control process, specifically, the target CL1 torque of the first clutch CL1 is set as (target driving torque-α) and is slip-engaged so as for the engine E to be feedback controlled to reach an idling rotation speed. Further, the motor generator MG is feedback controlled to assume a target rotation speed (yet, at a lower value than the idling rotation speed) that is obtained by adding the output side rotation speed Ncl2out of the second clutch CL2 a predetermined rotation speed β', while the second clutch CL2 is subject to feedback control to assume a transmission torque capacity corresponding to the target driving torque. Note that the predetermined rotation speed β' (=CL2 slip amount) will be set to assume a lower rotation speed as the heat generator of the second clutch CL2 is higher.

In step S10, following the NO determination at step S8, it is determined whether or not the operating point determinable depending on the current accelerator opening AP0 and the vehicle speed VSP is within the WSC drive mode area. The process proceeds to step S11 when YES (in the WSC drive mode area), while the process proceeds to step S12 when NO (outside of WSC drive mode region) with the determination that the system is within the HEV drive mode region.

In step S11, following the YES determination at step S10, control executes the WSC control process, and the process proceeds to RETURN.

More specifically, in the WSC control process, the engine E is controlled by feed-forward in accordance with a target torque with the first clutch completely engaged, the motor generator MG is feedback controlled to assume an idle speed, and the second clutch CL2 is feedback controlled to assume a transmission torque capacity corresponding to the target driving torque. Note that, in the MWSC corresponding mode map where the EV drive mode is not provided, the WSC control process in the step S11 includes a mode transition process from the EV drive mode.

In step S12, following the NO determination in step S10, the control executes the HEV control process, and the process proceeds to RETURN.

In the HEV control process, specifically, both the engine E and the motor-generator MG are feedback controlled to assume a target driving torque with the first clutch CL1 completely engaged, and the second clutch CL2 is completely engaged. Note that in the MWSC corresponding mode map where the EV drive mode is not provided, the HEV control process in step S12 includes a mode transition process from the EV.

In step S13, subsequent to the NO determination at step S1, it is determined whether or not the estimated gradient is less than the predetermined values g1. The control proceeds to step S14 when YES (when the estimated gradient<g1), and the control proceeds to step S4 and continues the control by the MWSC corresponding mode map when NO (estimated gradient≥g1).

In step S14, following the YES determination at step S13, the switch to the normal mode map from the MWSC corresponding mode map is made and the process proceeds to step S15.

In step S15, following the map switching in step S14, it is determined whether the drive mode is changed associated with the map switching. The process proceeds to step S16 when YES (with drive or running mode change), the process proceeds to step S17, when NO (running mode not changed).

Note that, when switching to the normal mode map from the MWSC corresponding mode map would occur.

In step S16, following the YES determination at step S15, the control performs a drive mode changing process, and the process proceeds to step S17.

More specifically, for example, at the transition to the WSC drive mode from the MWSC drive mode, the target rotation speed of the motor generator MG is changed to the idle speed, and the first clutch CL1 is engaged upon synchronization. Further, the engine control will be switched from an idle rotation speed feedback control to a feed-forward control of the target engine torque.

In step S17, following the NO determination at step S2, the NO determination at step S15, or drive mode change process in step S16, a control process based on the normal mode map is executed and the process proceeds to RETURN.

A description is now given of the operations.

The operations in the control unit for the hybrid vehicle of the first embodiment are divided into [Comparisons among the WSC control, the MWSC control, and the MWSC+CL1 slip control], [the operation of the WSC drive mode], [the operation of the MWSC drive mode], and [the operation of the MWSC+CL1 slip control drive mode], and described separately.

[Comparison of WSC Control, MWSC Control and MWSC+CL1 Slip Control]

Figure 8:
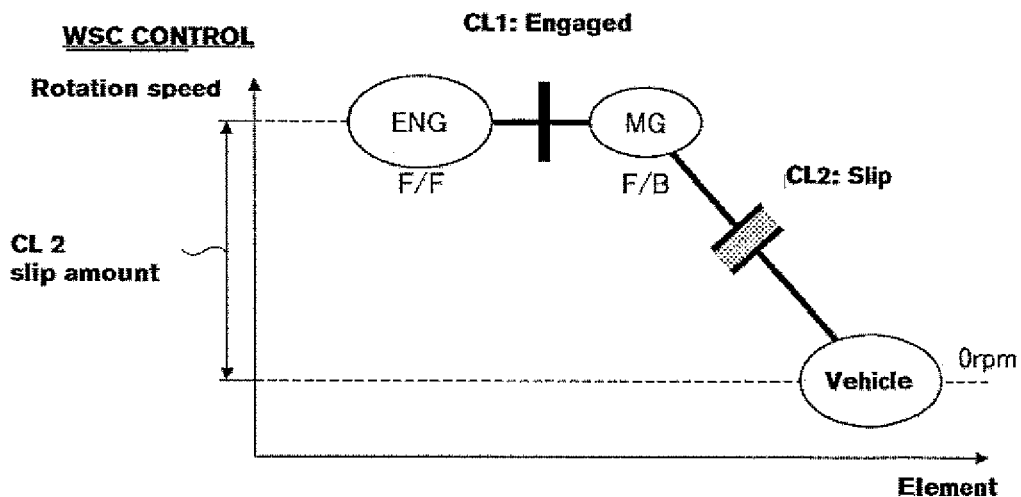
FIG. 8 is a schematic diagram illustrating the operating point of each actuator during a WSC control.
Figure 9:
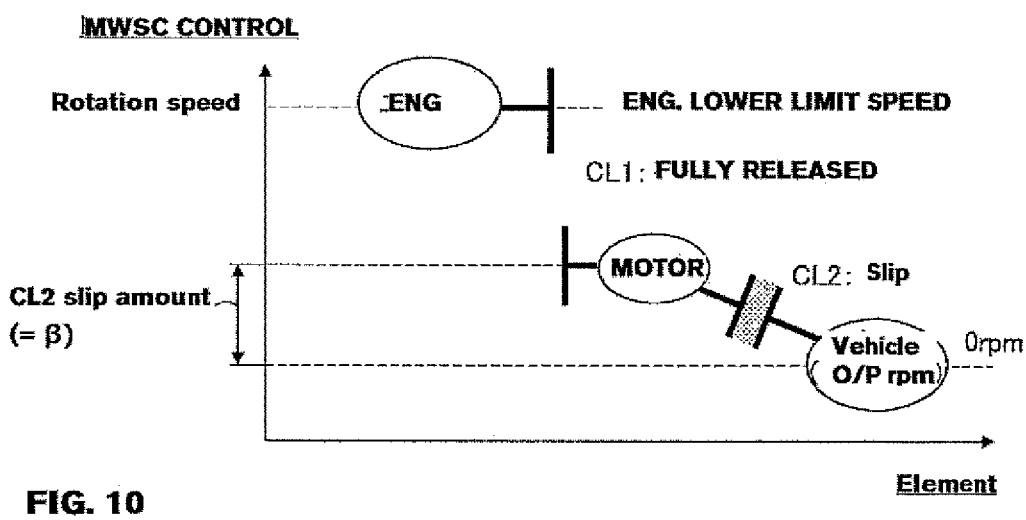
FIG. 9 is a schematic diagram illustrating the operating point of each actuator during a MWSC control.
Figure 10:
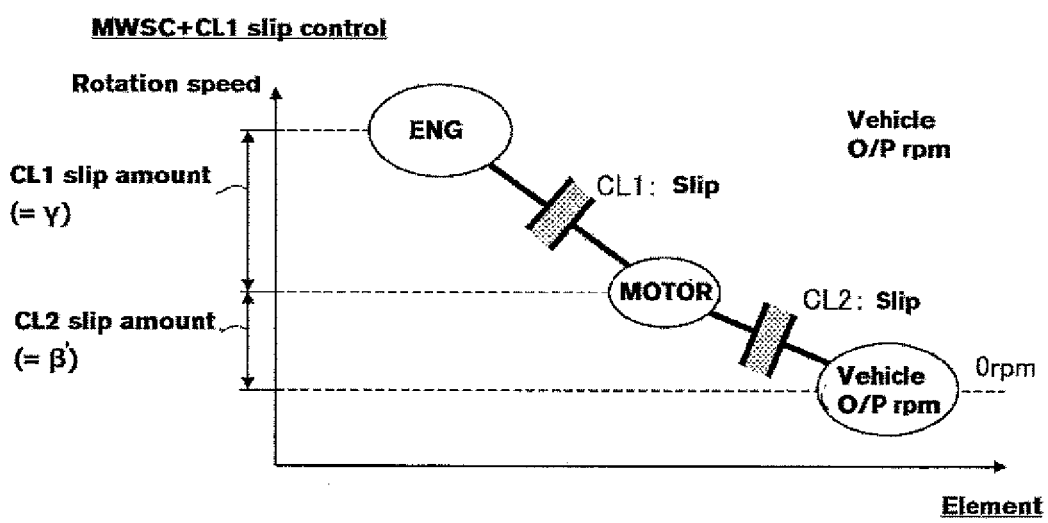
FIG. 10 is a schematic diagram illustrating the operating point of each actuator during a MWSC+CL1 slip control.

FIG. 8 is a schematic diagram illustrating the operating point of each actuator during a WSC control, FIG. 9 is a schematic diagram illustrating the operating point of each actuator during a MWSC control, and FIG. 10 is a schematic diagram illustrating the operating point of each actuator during a MWSC+CL1 slip control. Hereinafter, with reference to FIG. 8 to FIG. 10, a description will be given in comparison to the WSC control, the MWSC control, and the MWSC+CL1 slip control.

As shown in FIG. 8, in the "WSC control", the engine E is feed-forward controlled in accordance with a target engine torque with the first clutch CL1 fully engaged, and the motor generator MG is feedback controlled to attain an idle rotation speed. In addition, the second clutch CL2 is feedback controlled in a slip engagement so as to have a transmission torque capacity corresponding to the target driving torque.

In the "MWSC control", as shown in FIG. 9, the first clutch CL1 is released with the engine in operation and the engine E is feedback controlled to attain the idle rotation speed. In addition, the motor generator MG is feedback controlled to reach a target rotation speed obtained by adding to the output side rotation speed Nct2out of the second clutch CL2 a predetermined rotation speed β (yet, lower than the idle speed). Further, the second clutch CL2 is feedback controlled through a slip engagement so as to assume a transmission torque capacity corresponding to the target driving torque.

In the "MWSC+CL1 slip control", as shown in FIG. 10, the first clutch CL1 is slip engaged to reach a target torque of CL1 to be (target driving torque-α), and the engine E is feedback controlled to assume an idle rotation speed. In addition, the motor generator MG is feedback controlled to attain a target rotation speed obtained by adding to the output rotation speed Ncl2out of the second clutch CL2 a predetermined rotation speed β' (yet, lower than the idle speed). Further, the second clutch CL2 is feedback controlled to assume a transmission torque capacity corresponding to the target driving torque under slip engagement. Note that the predetermined rotation speed β' (=CL2 slip amount) is set at a lower rotation speed as a temperature of the CL2 is higher.

The WSC drive mode in the "WSC Control" is characterized in that the engine E remains to operate and the first clutch CL1 is completely engaged. In the WSC drive mode, the difference between the driving wheel rotation speed and the engine rotation speed is absorbed by the slipping of the second clutch CL2. Further, since the change in the target driving torque may be responded by the change in the torque capacity of the second clutch CL2, the responsiveness with respect to change in the target driving torque is high. In addition, with the second clutch CL2 being placed under a slip control to attain a transmission torque capacity in accordance with a target driving torque, the vehicle is propelled by a driving force using the engine E and/or the motor generator MG.

The MWSC drive mode by the "MWSC control" is characterized in that the first clutch CL1 is released, which is fully engaged in the WSC drive mode. In the MWSC drive mode, without being bound to the idle speed of the engine E, it is possible to control the amount of slip by the rotation speed control of the motor generator MG, as compared with the WSC drive mode, the slip amount of the second clutch CL2 (=β) may be reduced. Then, the second clutch CL2 is placed under the slip control by causing the transmission torque capacity to be accommodated according to the target driving torque, and the vehicle travels using the driving force of the motor generator MG.

The MWSC+CL1 slip control drive mode by "MWSC+CL1 slip control" is characterized by the slip-engagement of the first clutch CL1 that is released in the MWSC drive mode. In the MWSC+CL1 slip control drive mode, it is possible to reduce the slip amount of the second clutch CL2 (=β') as in the MWSC drive mode. Further, since the transmission torque capacity of the first clutch CL1 is applied as the driving torque, it is possible to reduce the motor torque of the motor generator MG. Then, the slip control is executed to cause the second clutch CL2 to assume the transmission torque capacity according to the target driving torque, and the vehicle travels using the driving force of the engine E and the motor generator MG (First embodiment 1). Alternatively, the vehicle travels using the driving force of the engine E (Second embodiment). Or, the power travels using the driving force of the engine E (Third and fourth embodiments).

[WSC Drive Mode Operation]

An explanation is now given of the reason for the provision of the WSC drive mode region. According to the hybrid vehicle in the first embodiment, because of absence of an element such as a torque converter for absorbing the rotational difference, if the first clutch CL1 and the second clutch CL2 would be fully engaged, the vehicle speed is determined according to the rotation speed of the engine E. The engine E has a lower limit value as an idle speed to ensure an autonomous or independent rotation, and the lower limit is increased further when an idle-up operation is in place for the warm-up operation of the engine. Further, there may be a case in which transition to the HEV drive mode quickly will not be ensured with the target driving torque being high.

On the other hand, in the EV drive mode, in order to release the first clutch CL1, there is no limitation associated with the lower limit value according to the engine speed. However, there is no other option but to have the engine to produce a stable torque when traveling by the EV drive mode is difficult by restriction based on the battery SOC, or in the region in which the target driving torque cannot be achieved through only the motor generator MG.

Therefore, in the region lower in a vehicle speed corresponding to the lower limit value and when the travel in the EV drive mode is difficult or the target driving torque is not achieved by the motor generator MG only, the WSC drive mode will be selected where the engine rotation speed is maintained at the lower limit speed with the second clutch CL2 under a slip control to travel using the engine torque.

In the first embodiment, when the normal mode map is selected and when the estimated gradient is g2 or below, in the flowchart of FIG. 7, the flow proceeding along "step S1→step S2→step S17→return" is repeated. Then, in step S17, when the operating point according to the current accelerator opening AP0 and the vehicle speed VSP is within the WSC drive mode region, the WSC drive mode is selected.

Further, when the normal mode map is selected and the estimated gradient is greater than g2, in the flowchart of FIG. 7, the process proceeds along "step S1→step S2→step S3, and, in step S3, the normal mode map is switched to the MWSC corresponding mode. Therefore, when the operating point defined by the current accelerator opening AP0 and the vehicle speed VSP is in the WSC drive mode region, the process proceeds from step S3 along "step S4→Step S8→Step S10→step S11→return", and the WSC drive mode by WSC control process is selected.

On the other hand, when, although the operating point based on the current accelerator pedal opening and the vehicle speed is within the MWSC drive mode region, but when the condition in step S5 and step S6 is not satisfied, the process proceeds from the step S3 along "step S4→step S5(→step S6)→Step S11→return", and the WSC drive mode by WSC control process is selected.

Therefore, when the WSC drive mode is selected in the flat road at startup or the like, it is possible to obtain the following benefits.

(a) The second clutch CL2 serves to function as an element to absorb the rotation Difference between the driving wheel rotation speed and the engine rotation speed so as to be capable of absorbing the rotation difference by the slippage of the second clutch CL2.

(b) Because the second clutch CL2 is set to assume a transmission torque capacity according to the target driving torque, it is possible to perform the start the vehicle by transmitting to the drive wheel a drive torque that the driver requires.

(c) Because It is possible, with respect to the target drive torque change due to the change in the vehicle speed VSP or changes in the accelerator opening APO, without waiting for the driving force change by the engine E, to respond by the transmission torque capacity change of the second clutch CL2, responsiveness to a target driving torque change is high.

[MWSC Driving Mode Operation]

An explanation for the reason of provision of the MWSC drive mode region is first given. When the estimated gradient of the traveling road surface is greater than a predetermined gradient (g2 or g1), for example, and an attempt to maintain in the low speed starting state or in the stopped state of the vehicle without performing brake pedal operation, a larger driving force as compared with the flat road is required, because there is a need to counter a gradient relevant load acting on the vehicle.

From the viewpoint of avoiding the heat generation caused by slippage of the second clutch CL2, when there is room or allowance in the battery SOC, selection of the EV drive mode is an alternative option. At this time, when transitioning from the EV drive mode region to the WSC drive mode region, it is necessary to perform engine start. Thus, the motor generator will generate a driving torque while securing a torque for the engine starting, the upper limit of the driving torque would be overly narrowed.

In addition, in the EV drive mode, when holding the motor generator MG to stop or rotating at very low speed with outputting to the motor generator MG only torque, lock current (a phenomenon that current continues to flow in one element) flows to the switching element of the inverter, which can lead to deterioration of the durability.

Further, in the region lower than the lower limit vehicle speed VSP1, which corresponds to the idle speed of the engine E in the first speed ratio (hereinafter VSP2 in FIG. 6), the rotation of the engine E itself cannot be decreased than the idle speed. At this time, when selecting the WSC drive mode, the slip amount of the second clutch CL2 is increased, which may adversely affect the durability of the second clutch CL2.

In particular, in an ascending slope road, since a large driving force is required as compared with a flat road, the transmission torque capacity required of the second clutch CL2 is higher, the state in which high slip amount is continued at a high torque can easily result in reduced durability of the second clutch CL2. Further, since the increase of the vehicle speed is also slow, there is a possibility that it takes time before the transition to the HEV drive mode, involving a possibility of further heat generation.

Therefore, while operating the engine E, a MWSC drive mode is prepared to release the first clutch CL1, while controlling the transmission torque capacity of the second clutch CL2 to match the target driving torque of the driver, and to feedback control the rotation speed of the motor generator MG to assume a target rotation speed higher by a predetermined rotation speed than an output rotation speed of the second clutch CL2.

In other words, the control is intended to slip control the second clutch CL2 while holding the rotational state of the motor generator MG lower than the idle speed of the engine. At the same time, the engine E is switched to the feedback control in which the idle speed is set as a target rotation speed. In the WSC drive mode, the engine speed has been maintained by the rotational speed feedback control of the motor generator MG. In contrast, upon the first clutch CL1 being released, the engine rotation speed will not be able to be controlled to the idle speed by the motor generator MG. Therefore, the engine speed feedback control is performed by the engine E itself.

In the first embodiment, when the normal mode map is selected and the estimated gradient is greater than g2, in the flowchart of FIG. 7, the process proceeds along "step S1→step S2→step S3, and in step S3, the normal mode map is switched to the MWSC corresponding mode map. Therefore, when the operating point according to the current accelerator opening APO and the vehicle speed VSP is in the MWSC drive mode region, and when both the battery SOC condition and the second clutch torque condition are satisfied, the process proceeds from "step S3 along "step S4→step S5→step S6→step S7". In step S7, the MWSC drive mode according MWSC control process is selected. Then, in the flowchart of FIG. 7, the flow proceeding along "step S1→step S13→Step S4→Step S5→step S6→step to S7→return" is repeated, as long as the estimated gradient is g1 or more, and the selection of the MWSC drive mode by MWSC control process is maintained.

Therefore, when the MWSC drive mode is selected in the uphill at startup or the like, it is possible to obtain the benefits described below.

(a) It is not necessary to leave the driving torque for the engine starting with the motor generator MG because the engine E is in the operating state so as to increase the drive torque upper limit of the motor-generator MG. Specifically, when viewed in the target driving torque shaft, the region can correspond to the target driving torque higher than the region of EV drive mode.

(b) It is possible to improve the durability of the switching element and the like by securing the rotation state of the motor generator MG.

(c) Since the motor generator MG is allowed to rotate at a rotation speed lower than the idle speed, it is possible to reduce the slip amount of the second clutch CL2, and to improve the durability of the second clutch CL2 (CL2 protection control).

[MWSC+CL1 Slip Control Drive Mode Operation]

An explanation is given of the reason for provision of the MWSC+CL1 slip control drive mode region. The MWSC drive mode is performed to reduce the slip rotation speed of the second clutch CL2 by using the motor generator MG. Therefore, if there is an output restriction of the motor generator MG or the output limitation of the battery 4, it is impossible to apply the MWSC drive mode.

Therefore, in the limited time of unavailability of the MWSC drive mode, for example, a travel mode is assumed in which the second clutch CL2 is fully engaged while allowing for a slip control at startup by the first clutch CL1. In the case of this drive mode, due to the slip amount of the first clutch CL1 being increased, there are effects on the durability of the first clutch CL1. Moreover, due to the fully engaged state of the second clutch CL2, a step occurs when entering the slipping state of the second clutch CL2 again. Furthermore, in carrying out power generation, it is necessary to balance against the first clutch torque.

Therefore, when the motor torque of the motor generator MG is unable to secure a driver requiring driving torque (=target drive torque), it is impossible to maintain the MWSC drive mode. Accordingly, it will be forced to select the WSC drive mode, and at startup on the upward slope or the like, a slip rotation speed of the second clutch CL2 increases (complete engagement of the first clutch CL1), and the durability of the second clutch CL2 is adversely affected.

That is, when it is not possible for the motor torque to ensure the driver requiring torque (=target driving torque) so that the MWSC drive mode may not be maintained, a drive mode replacing the MWSC drive mode is required. At this time, the MWSC+CL1 Slip control drive mode is selected.

In the first embodiment, when the normal mode map is being selected and the estimated gradient is greater than g2, in the flowchart of FIG. 7, the process proceeds along step S1→step S2→step S3, and in step S3, the normal mode map is switched to the MWSC corresponding mode map. Therefore, when the operating point determined by the accelerator pedal opening AP0 and the vehicle speed VSP is within the MWSC+CL1 slip control mode region, the process proceeds from step S3 along Step S4→step S8→step S9, and in step S9, the MWSC+CL1 slip control drive mode by the MWSC+CL1 slip control process selected. Then, as long as the estimated gradient is g1 or more, in the flowchart of FIG. 7, the flow proceeding step S1→step S13→Step S4→Step S8→Step S9→RETURN is repeated. Then, the selection of the MWSC+CL1 slip control drive mode by the MWSC+CL1 slip control process is maintained.

Now, an explanation is given of the reason for reduction of the motor torque upon the selection of the MWSC+CL1 slip control drive mode with reference to FIGS. 8 to 10.

The equation of motion about the engine axis is expressed by:

$$\text{Teng}-\text{Tcl1}=\text{Ieng}*d\omega\text{eng} \quad (1)$$

The equation of motion about the motor shaft is represented by:

$$\text{Tmg}+\text{Tcl1}-\text{Tcl2}=\text{Img}*d\omega\text{mg} \quad (2)$$

Wherein,
Teng: engine torque
Tmg: motor torque
Tcl1: CL1 torque capacity
Tcl2: CL2 torque capacity
Ieng: engine inertia
Img: motor inertia
dωeng: engine rotation angular acceleration
dωmg: motor rotation angular acceleration.

In the case of the MWSC mode, since Tcl1=0, the equation (1) may be expressed by:

$$\text{Teng}=\text{Ieng}*d\omega\text{eng} \quad (1\text{-}1)$$

The above formula (2) may be expressed by:

$$\text{Tmg}-\text{Tcl2}=\text{Img}*d\omega\text{mg} \quad (2\text{-}1)$$

Therefore, when selecting the MWSC mode, as can be seen from equation (2-1), it is needed for the motor torque Tmg enough to counter the CL2 torque capacity Tcl2.

In contrast, in the case of the MWSC+CL1 slip control drive mode, since Tcl1>0, as can be seen from equation (2), the CL2 torque capacity Tcl2 is countered by the torque that is the sum of CL1 torque capacity Toll and motor torque Tmg. Therefore, it is possible to reduce the motor torque Tmg by the amount of CL1 torque capacity Tcl1 (>0).

In the case of the first embodiment, since the target CL1 torque is given by a target driving torque (=CL2 torque capacity Tcl2)−α, the above equation (2) may now be expressed by:

$$\text{Tmg}-\alpha=\text{Img}*d\omega\text{mg} \quad (2\text{-}2)$$

Because Tcl2>α, as can be seen from equation (2-2) described above, it is sufficient to provide a motor torque Tmg than can compete with α (<Tcl2).

Figure 11:
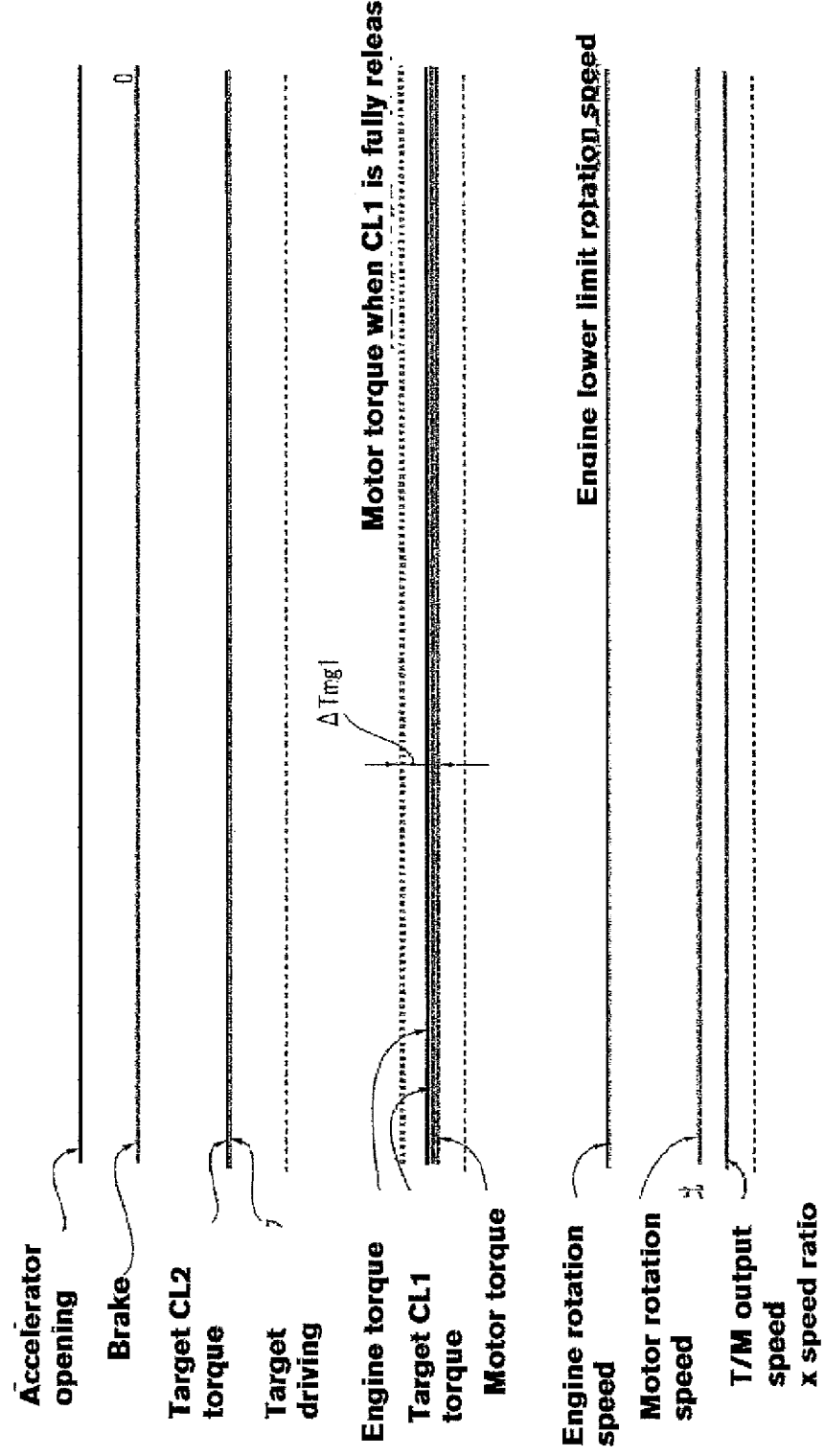
FIG. 11 is a time chart in the case during a travel with a MWSC+CL1 slip control being chosen in a first embodiment (target CL1 torque=target driving torque-a) with travelling being commensurate with a slope at a constant accelerator opening.

FIG. 11 is a time chart in a first embodiment where the target CL1 torque is set to be the (target driving torque−α) with balancing with a slope at a constant accelerator opening. In other words, the travel by selecting the MWSC+CL1 slip control drive mode becomes a traveling using part of the engine torque and a reduced motor torque, as shown in FIG. 11, the motor torque during the time of the MWSC+CL1 slip control is represented by reduction of ΔTmg1 than the motor torque at the time of the MWSC control, as shown in FIG. 11. Stated another way, even if the output of the motor generator MG or the output of the battery 4 are restricted, when the α (<Tcl2) can be secured as a motor torque, the MWSC+CL1 slip control drive mode is selectable.

Further, the condition of the accelerator opening to transition to the MWSC+CL1 slip control drive mode is defined, as shown in FIGS. 6A, 6B, to be an upper limit value AP01 or more, at which the MWSC drive mode is selected.

Thus, by selecting the MWSC drive mode as long as the motor generator MG may be used compared to when mode change or transition would occur to the MWSC+CL1 slip control drive mode while the motor generator MG is usable, the load on the first clutch CL1 is reduced.

In addition, the slip amount β' of the second clutch CL2 in the MWSC+CL1 slip control drive mode is set lower as calorific value of the second clutch CL2 at mode transition from MWSC drive mode is higher.

That is, in the MWSC+CL1 slip control drive mode, as shown in FIG. 10, the rotational speed difference between the engine E (idle rotation speed) and the vehicle will be shared by the CL1 slip amount and that of CL2 slip amount β'. Therefore, when the selection of the MWSC drive mode is continued, at the mode transition to the MWSC+CL1 slip control drive mode, the load on the second clutch CL2 will be reduced.

Therefore, when selecting the MWSC+CL1 slip control drive mode at the upslope start or the like, it is possible to obtain the following benefits.

(a) When the MWSC+CL1 slip control drive mode is selected, due to slippage of the first clutch CL1, the motor torque of the motor generator MG is reduced. As a result, it is possible to reduce the power consumption and improve durability of the motor generator MG.

(b) By selecting the MWSC+CIA slip control drive mode at the accelerator opening degree limit APO1 or more where the MWSC drive mode is selected, the selection of the MWSC drive mode is maintained while the motor generator MG can be used. As a result, the load of the first clutch CL1 due to an extended selection of the MWSC+CL1 slip control drive mode over long period of time may be reduced.

(c) The slip amount β' of the second clutch CL2 in the MWSC+CL1 slip control drive mode is decided by the amount of heat generated by the second clutch CL2 at the mode transition from the MWSC drive mode. As a result, after the mode transition to the MWSC+CL1 slip control drive mode, it is possible to reduce the load of the second clutch CL2 (CL2 protection control).

(d) The target CL1 torque in the MWSC+CL1 slip control drive mode is set by (target driving torque-α). Therefore, due to the use of part of the engine torque, it is possible to surely reduce the motor torque of the motor generator MG so that the motor torque reduction amount may be adjusted.

In a control device for a hybrid vehicle of the first embodiment, it may be possible to obtain one or more of the following effects.

(1) Provided are an engine E;
  a motor (motor generator MG) operative for outputting a driving force of the vehicle and performing a startup of the engine E;
  a first engagement element (first clutch CL1) interposed between the engine E and the motor (motor generator MG) for selectively connecting and releasing the engine E and the motor (motor generator MG);
  a second engagement element (second clutch CL2) interposed between the motor (motor generator MG) and a driving wheel (left and right rear wheels RL, RR) for selectively engaging and releasing the motor (motor generator MG) and the driving wheel (left and right rear wheels RL,RR);
  a driving force transmission load detecting device (road surfaced gradient estimation calculation unit 201) for detecting or estimating the load of the driving force transmission system; and
  an engine/motor slip drive control unit (step S9 in FIG. 7) for slip engaging the first engagement element (first clutch CL1) with the engine E maintaining in rotating state at a predetermined rotation speed while for slip engaging the second engagement element (second clutch CL2) with the motor (motor generator MG) at a rotation speed lower than the predetermined rotation speed.

Therefore, it is possible to reduce the motor torque at the time of the motor slip drive control to be executed when the load of the driving force transmission system is high.

(2) Provided are a motor slip drive control unit (step S7 in FIG. 7) that is operative, when the load of the driving force transmission system is a predetermined value or more, to release the first engagement element (first clutch CL1) with the engine E remaining to rotate at the predetermined rotation speed, while to slip engaging the second engagement element (second clutch CL2) with the motor (motor generator MG) rotating at a rotation speed lower than the predetermined rotation speed, wherein the engine/motor slip drive control unit (step S9 in FIG. 7) is configured to set an accelerator opening condition at which a motor slip drive control (MWSC control) is transitioned to an engine/motor slip drive control (MWSC+CL1 slip control) at an accelerator opening upper limit AP01 or above, at which the motor slip drive control unit (step S7 in FIG. 7) is selected (FIG. 6).

Therefore, in addition to the possible effects (1), by selecting the motor slip drive control (MWSC control) as long as the motor (motor generator MG) is usable, the frequency of selecting the engine/motor slip drive control (MWSC+CL1 slip control) may be suppressed so that the load on the first engagement element (first clutch CL1) may be reduced.

(3) The engine/motor slip drive control unit (Step S9 in FIG. 7) is configured to set the slip amount of the second engagement element during the engine/motor slip drive control (MWSC+CL1 slip control) according to the heating state the second engagement element (second clutch CL2) at the time of control transition from the motor slip drive control (MWSC control).

Therefore, in addition to the possible effects of (2), it may be possible to reduce the load on the second engagement element (second clutch CL2) after mode transition to the engine/motor slip drive control (MWSC*CL1 slip control).

(4) The engine/motor slip drive control unit (Step S9 in FIG. 7) is configured to set a target engagement torque of the first engagement element (first clutch CL1) to a torque value obtained by subtracting a predetermined value α from the target drive torque.

Therefore, in addition to the effects (1) to (3), it may be possible to surely reduce the motor torque of the motor (motor generator MG) by using a part of the engine torque, the amount of reduction in the motor torque can be adjusted by adjusting the setting of the predetermined value α.

Second Embodiment

In the second embodiment, in the MWSC+CL1 slip control, the target CL1 torque is given by the target driving torque.

To describe the structure, since the configuration of the second embodiment is the same as the first embodiment except for step 9 in FIG. 7, no specific figure is shown. Thus, a description is give of the step 7 in the second embodiment.

In step S9, following the YES determination at step S8, the system performs the MWSC+CL1 slip control process, and the process proceeds to RETURN. Specifically, in the MWSC+CL1 slip control process, the first clutch CL1 is slip-engaged by setting a target CL1 torque as the (target driving torque), the engine E is feedback controlled to reach an idle rotation speed, the motor generator MG is feedback controlled to attain a target rotation speed (yet, lower value than the idle speed) obtained by adding the output side rotation speed Nxl2out of the second clutch CL2 a predetermined rotation speed β'. Further, the second clutch CL2 is feedback controlled to assume a transmission torque capacity according to the target driving torque. Note that the predetermined rotation speed β' (=CL2 slip amount) is set at a lower rotation speed, as the calorific value of the second clutch CL2 is higher.

Next, a description is given of the operation of the second embodiment. Since the target CL1 torque is given by the target driving torque (=CL2 torque capacity Tcl2), the equation (2) above may be expressed;

$$Tmg = Img * d\omega mg \tag{2-3}$$

It is apparent from the equation (2-3) that the motor torque Tmg may be zero, i.e., Tmg=0.

Figure 12:
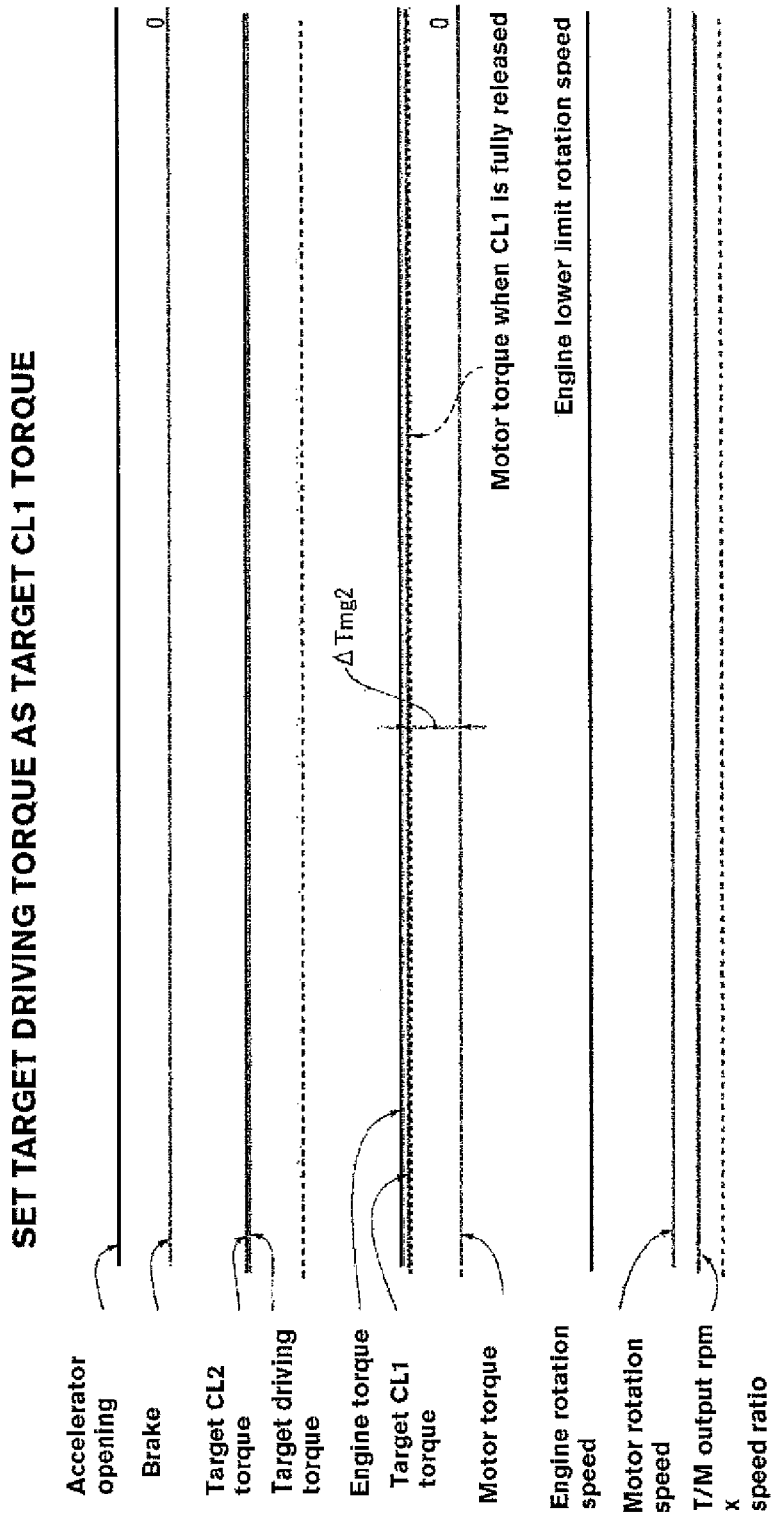
FIG. 12 is a time chart in the case during a travel with the MWSC+CL1 slip control being chosen in a second embodiment (target CL1 torque=target driving torque) with travelling being commensurate with a slope at a constant accelerator opening.

FIG. 12 is a time chart in the case in which the target CL1 torque is set to the target driving torque at travelling with being commensurate with a slope at a constant accelerator opening in the second embodiment. In other words, travelling with the MWSC+CL1 slip control drive mode being selected is performed using only a part of the engine torque, and the motor torque at the time of the MWSC+CL1 slip control is reduced by ΔTmg2 from the motor torque at the MWSC control mode. Stated differently, even if the motor torque Tmg cannot be secured at all due to the restriction of the output of the motor generator MG, the restriction of the battery 4, etc., it is possible to select the MWSC+CL1 slip control drive mode.

Note that, since the other operations are the same as those in the first embodiment, specific description is omitted.

In a control device for a hybrid vehicle in the second embodiment, in addition to possible effects (1) to (3), one or more of the following effects may be obtained.

(5) The engine/motor slip drive control unit (Step S9 in FIG. 7) is configured to set the target engagement torque of the first engagement element (first clutch CL1) to assume a target driving torque.

Therefore, even when the output of the motor (motor generator MG), the output of the battery 4, etc., are restricted and the motor torque Tmg is not available at all, it is possible to select a drive mode by an engine/motor slip drive control (MWSC+CL1 slip control) that protects the second engagement element (second clutch CL2).

Third Embodiment

In the third embodiment, in the MWSC+CL1 slip control, the target CL1 torque is given by the (target driving torque+power generation torque).

To describe the structure, with the exception of step S9 in FIG. 7, the configuration of the third embodiment is the same as the first embodiment. Therefore, specific figures are omitted. Below, a description of the step S9 in the third embodiment is given.

In step S9, following the YES determination at step S8, the system performs the MWSC+CL1 slip control process, and the process proceeds to RETURN. In the MWSC+CL1 slip control process, specifically, the first clutch CL1 is slip-engaged by setting the target CL1 torque as the (target driving torque+power generation torque) maintaining the engine in operation, and the engine E is feedback controlled in order for the engine to rotate at idle speed. Further, the motor generator MG is feedback controlled so as to attain a target rotation speed (yet, at lower value than idle speed) obtained by adding the output side rotation speed Nclsout of the second clutch CL2 a predetermined rotation speedy β'. In addition, the second clutch CL2 is feedback controlled to assume a transmission torque capacity corresponding to the target driving torque. Note that the predetermined rotation speed β' (=CL2 slip amount) is set at a lower rotation speed, as the calorific value of the second clutch CL2 increases.

Now, operations are described. In the third embodiment, since the target CL1 torque is given by the sum of the target driving torque (=CL2 torque capacity Tcl2) and power generation torque, the above equation (2)

May be expressed by;

$$Tmg + \text{generation torque} = Img \cdot d\omega mg \quad (2\text{-}4)$$

As is clear from the equation (2-4), the motor torque Tmg becomes negative due to the part of power generation torque.

Figure 13:
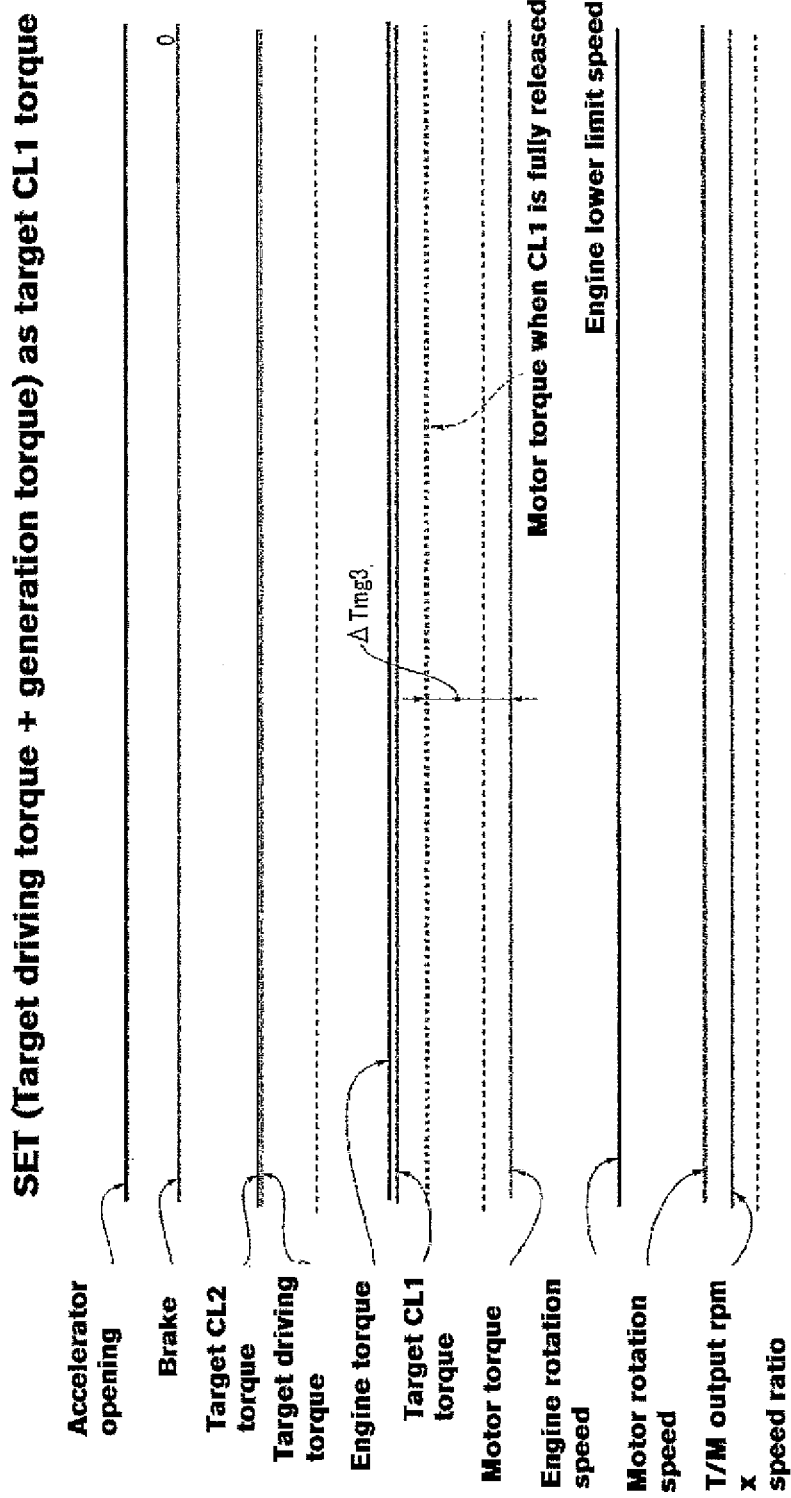
FIG. 13 is a time chart in the case during a travel with the MWSC+CL1 slip control being chosen in a third embodiment (target CL1 torque=target driving torque+generation torque) with travelling being commensurate with a slope at a constant accelerator opening.

FIG. 13 is a time chart in the case in which the target CL1 torque is set to be (target driving torque+generation torque) in the third embodiment with balancing travel on a slope at a constant acceleration pedal opening. In other words, the travelling through the selection of the MWSC+CL1 slip control drive mode is represented by a power generation travel in which a part of the engine torque is used for a driving torque for travel and a part of the engine torque is used for a power generation torque. The motor torque at the time of the MWSC+CL1 slip control is, as shown in FIG. 13, reduced by ΔTmg3 from the motor torque in the MWSC control. In other words, even when charging of the battery 4 is required, in addition to the complete unavailability of the motor torque Tmg due to restrictions on the output of the motor generator MG or on the output of the battery 4, the MWSC+CL1 slip control drive mode is selected to perform the power generation travel.

Note that, since the other operations are the same as the first embodiment, descriptions are omitted.

In a control device for a hybrid vehicle in the third embodiment, in addition to effects (1) to (3), one or more of the following effects may be available.

(6) The engine/motor slip drive control unit (Step S9 in FIG. 7) is configured to set a target engagement torque of the first engagement element (first clutch CL1) to a torque value obtained by adding the target driving torque a power generation torque.

Thus, when charging of the battery 4 is needed, it is possible to select the power generation drive mode by the engine/motor slip drive control (MWSC+CL1 slip control) to protect the second engagement element (second clutch CL2).

Fourth Embodiment

In the fourth embodiment, an example is set forth in which the MWSC+CL1 slip control in which the target CL1 torque is given by (target driving torque+torque generation) in the third embodiment is applied to a cooperative, or collaborating control to ensure a battery SOC>

To describe the configuration in FIG. 7, when it is determined that operation is within the MWSC drive mode region in step S4, control proceeds to step S9 from step S5 (however, SOC≤control intervention threshold), and, the MWSC+CL1 slip control process is performed in which the target CL1 torque is given by (target driving torque+power generation torque). Then, when the battery SOC rises to the intervention release threshold due to the MWSC+CL1 slip control processing, control returns again to the MWSC control processing. The fourth embodiment thus represents an example of repetitive performing both the power generation mode through the MWSC+CL1 slip control and the MWSC control so as to perform the cyclic operation of switching repeatedly while monitoring the battery SOC. Note that the other configurations are the same as the third embodiment.

Figure 14:
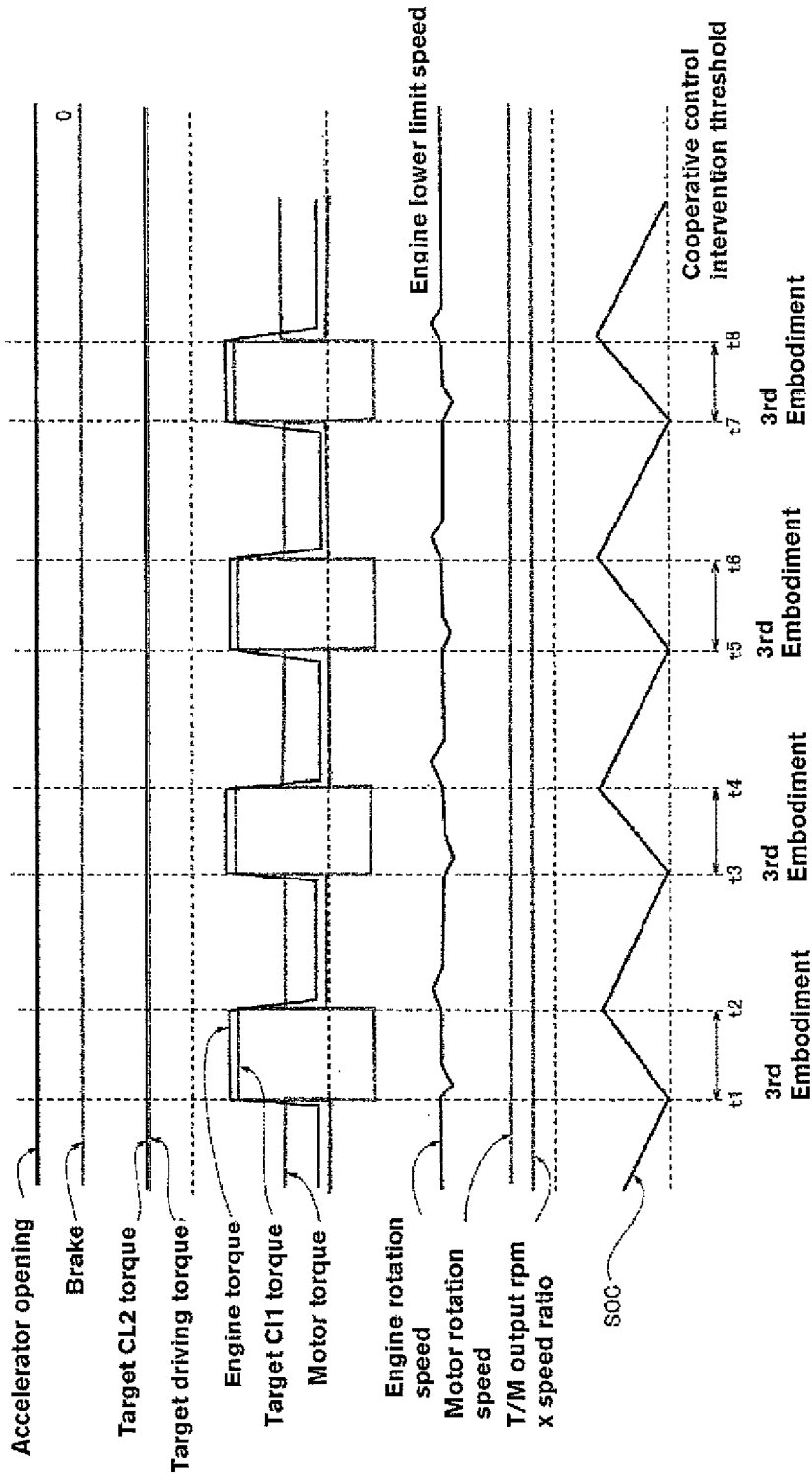
FIG. 14 is a time chart in the case during a travel with the MWSC+CL1 slip cooperative control being chosen in a fourth embodiment of the MWSC+CL1 slip control with travelling being commensurate with a slope at a constant accelerator opening.

Now, operations are described. FIG. 14 is a time chart in the case in which the MWSC+CL1 slip control is applied discussed in the third embodiment and the target CL1 torque is given by (target driving torque+power generation torque) to the cooperative control for securing the battery SOC with a slope being balanced at a constant accelerator opening. That is, by executing the MWSC control using the motor torque, upon the battery SOC being equal to the control intervention threshold value or less at time t1, the MWSC+CL1 slip control of the third embodiment is performed, and the battery SOC rises from time t1 to time t2. Then, when the battery SOC reaches the intervention release threshold at time t2, the program returns to the MWSC control again and maintains the MWSC control until time t3 at which the battery SOC falls below the control intervention threshold. This cyclic operation of repetitions are repeated between time t3 to time t8. Therefore, when selecting the MWSC control drive mode in situations that require battery charging, by applying the power generation mode by MWSC+CL1 slip control by cyclic operation as intervention control, reduction of the battery SOC is suppressed and the maximum maintaining of the MWSC control may be assured.

Note that the other operations are the same as those in the third embodiment, specific descriptions will be omitted.

In a control device for a hybrid vehicle in the fourth embodiment, in addition to possible effects (6) in the third embodiment, one or more of the following effects may be obtained.

(7) The engine/motor slip drive control unit (step S9 in FIG. 7) is configured to perform cyclic operations in which the motor slip drive control (MWSC control) is switched to a power generation mode by the engine/motor slip drive mode (MWSC+CL1 slip control) upon the battery charge capacity (battery SOC) decreases to a control intervention threshold or below during the motor slip drive control while the power generation mode by the engine/motor slip drive control (MWSC+CL1 slip control) is switched to the motor slip drive mode (MWSC control) upon the battery charge capacity rises to an intervention release threshold or above.

Thus, during the selection of the motor slip drive control (MWSC control) in situations that require battery charging, by applying the power generation mode by the engine/motor slip drive control (MWSC+CL1 slip control) through cyclic operations as intervention control, it is possible to suppress the decrease in the battery SOC and to maintain maximum motor slip drive control (MWSC control).

The foregoing has been described with reference to specific embodiments. However, the invention is not limited to the above, and changes in design or addition of matters may be acceptable without departing from the scope of the invention.

In one or more embodiments of the present invention, an example of using a road surface gradient estimating calculation unit 201 is used as a load detecting device of the driving force transmission system. However, as the load detecting device of the driving force transmission system, the presence or absence of vehicle towing may be detected, or, a superimposed loadage may be employed. When the load of the driving force transmission system is large, the increase in vehicle speed is slow and the second clutch CL2 is tempted to generate heat. Further, a detected temperature, estimated temperature, or estimated heat amount of the second clutch CL2 may be used. For example, when the estimated heat amount of the second clutch CL2 is used as the driving force transmission system relevant load, the CLS heat generation amount will be estimated by integrating the differential rotation across the second clutch CL2 multiplied by the transmission torque capacity of the second clutch CL2 over time. Then, when the CL2 estimated heat generation amount exceeds a heat generation amount, the driving force transmission system load is determined to be great. At this time, considering an automatic transmission temperature for calculation of the CL2 heat generation amount, the accuracy in the CL2 heat generation amount will be improved.

In one or more embodiments of the present invention, when the uphill road surface gradient is a predetermined value or more, either the MWSC control or the MWSC+CL1 slip control is executed. However, alternatively, when the uphill road surface gradient is a predetermined value or more, and the detection temperature or estimated temperature of the second clutch exceeds a predetermined value, the MSC control or the MWSC+CL1 slip control may be performed.

Above, the control device according to one or more embodiments of the present invention is applied to a FR hybrid vehicle. However, the control device according to one or more embodiments of the present invention may also be applied to a FF type hybrid vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for a hybrid vehicle, comprising:
   an engine;
   a motor that outputs a driving force of the vehicle and that performs a startup of the engine;
   a first engagement element interposed between the engine and the motor that selectively connects and releases the engine and the motor;
   a second engagement element interposed between the motor and a driving wheel that selectively engages and releases the motor and the driving wheel;
   a driving force transmission system load detecting device that detects or estimates a load of the driving force transmission system;
   an engine/motor slip drive control unit that, when the load of the driving force transmission system is equal to or greater than a first predetermined value:
      slip engages the first engagement element with the engine maintaining in rotating state at a predetermined rotation speed, and
      slip engages the second engagement element with the motor at a rotation speed lower than the predetermined rotation speed; and
   a motor slip drive control unit that, when the load of the driving force transmission system is a second predetermined value or more:
      releases the first engagement element while the engine rotates at the predetermined rotation speed, and
      slip engages the second engagement element while the motor rotates at a rotation speed lower than the predetermined rotation speed,
      wherein the engine/motor slip drive control unit is configured to set an accelerator opening condition at which a motor slip drive control is transitioned to an engine/motor slip drive control at an accelerator opening upper limit or above, at which the motor slip drive control unit is selected, and
      wherein the first predetermined value is greater than the second predetermined value.

2. The control device of claim 1, wherein the engine/motor slip drive control unit is configured to set the slip amount of the second engagement element during the engine/motor slip drive control according to a heating state of the second engagement element at the time of control transition from the motor slip drive control.

3. A control device for a hybrid vehicle, comprising:
   an engine;
   a motor that outputs a driving force of the vehicle and that performs a startup of the engine;
   a first engagement element interposed between the engine and the motor that selectively connects and releases the engine and the motor;
   a second engagement element interposed between the motor and a driving wheel that selectively engages and releases the motor and the driving wheel;
   a driving force transmission system load detecting device that detects or estimates a load of the driving force transmission system; and
   an engine/motor slip drive control unit that, when the load of the driving force transmission system is equal to or greater than a first predetermined value:
      slip engages the first engagement element with the engine maintaining in rotating state at a predetermined rotation speed, and
   slip engages the second engagement element with the motor at a rotation speed lower than the predetermined rotation speed,
   wherein the engine/motor slip drive control unit is configured to set a target engagement torque of the first engagement element to a torque value obtained by subtracting a predetermined torque value from a target drive torque, and
   wherein the target drive torque is a drive torque required to be transmitted to the driving wheel.

4. A control device for a hybrid vehicle, comprising:
an engine;
a motor that outputs a driving force of the vehicle and that performs a startup of the engine;
a first engagement element interposed between the engine and the motor that selectively connects and releases the engine and the motor;
a second engagement element interposed between the motor and a driving wheel that selectively engages and releases the motor and the driving wheel;
a driving force transmission system load detecting device that detects or estimates a load of the driving force transmission system; and
an engine/motor slip drive control unit that, when the load of the driving force transmission system is equal to or greater than a first predetermined value:
    slip engages the first engagement element with the engine maintaining in rotating state at a predetermined rotation speed, and
    slip engages the second engagement element with the motor at a rotation speed lower than the predetermined rotation speed,
wherein the engine/motor slip drive control unit is configured to set a target engagement torque of the first engagement element to a torque value obtained by adding a target driving torque to a power generation torque, and
wherein the target drive torque is a drive torque required to be transmitted to the driving wheel.

5. The control device of claim 1,
wherein the engine/motor slip drive control unit is configured to set a target engagement torque of the first engagement element to a torque value obtained by subtracting a predetermined torque value from a target drive torque, and
wherein the target drive torque is a drive torque required to be transmitted to the driving wheel.

6. The control device of claim 2,
wherein the engine/motor slip drive control unit is configured to set a target engagement torque of the first engagement element to a torque value obtained by subtracting a predetermined torque value from a target drive torque, and
wherein the target drive torque is a drive torque required to be transmitted to the driving wheel.

7. The control device of claim 1, wherein the engine/motor slip drive control unit is configured to set the target engagement torque of the first engagement element to assume a target driving torque.

8. The control device of claim 2, wherein the engine/motor slip drive control unit is configured to set the target engagement torque of the first engagement element to assume a target driving torque.

9. The control device of claim 1,
wherein the engine/motor slip drive control unit is configured to set a target engagement torque of the first engagement element to a torque value obtained by adding a target driving torque to a power generation torque,
wherein the target drive torque is a drive torque required to be transmitted to the driving wheel.

10. The control device of claim 2,
wherein the engine/motor slip drive control unit is configured to set a target engagement torque of the first engagement element to a torque value obtained by adding a target driving torque to a power generation torque,
wherein the target drive torque is a drive torque required to be transmitted to the driving wheel.

\* \* \* \* \*